(12) United States Patent
Yamada et al.

(10) Patent No.: US 11,441,031 B2
(45) Date of Patent: Sep. 13, 2022

(54) THERMOPLASTIC RESIN COMPOSITION, MOLDED ARTICLE, METHOD FOR MANUFACTURING THERMOPLASTIC RESIN COMPOSITION, AND, METHOD FOR MANUFACTURING PLATED MOLDED ARTICLE

(71) Applicant: MITSUBISHI ENGINEERING-PLASTICS CORPORATION, Tokyo (JP)

(72) Inventors: Ryusuke Yamada, Hiratsuka (JP); Tatsuya Kikuchi, Hiratsuka (JP); Yuki Hiwatashi, Hiratsuka (JP)

(73) Assignee: MITSUBISHI ENGINEERING-PLASTICS CORPORATION, Tokyo (JP)

( * ) Notice: Subject to any disclaimer, the term of this patent is extended or adjusted under 35 U.S.C. 154(b) by 39 days.

(21) Appl. No.: 16/975,323

(22) PCT Filed: Feb. 25, 2019

(86) PCT No.: PCT/JP2019/006933
§ 371 (c)(1),
(2) Date: Aug. 24, 2020

(87) PCT Pub. No.: WO2019/167854
PCT Pub. Date: Sep. 6, 2019

(65) Prior Publication Data
US 2021/0032461 A1    Feb. 4, 2021

(30) Foreign Application Priority Data

Feb. 27, 2018  (JP) .............................. JP2018-032893
Apr. 27, 2018  (JP) .............................. JP2018-086111

(51) Int. Cl.
| | |
|---|---|
| C08L 69/00 | (2006.01) |
| C08G 59/50 | (2006.01) |
| C08K 3/04 | (2006.01) |
| C08K 3/22 | (2006.01) |
| C08K 7/14 | (2006.01) |
| C08L 67/03 | (2006.01) |
| C08L 77/00 | (2006.01) |
| C23C 18/20 | (2006.01) |

(52) U.S. Cl.
CPC .......... *C08L 69/00* (2013.01); *C08G 59/5033* (2013.01); *C08K 3/04* (2013.01); *C08K 3/2279* (2013.01); *C08K 7/14* (2013.01); *C08L 67/03* (2013.01); *C08L 77/00* (2013.01); *C23C 18/204* (2013.01); *C08K 2003/2231* (2013.01); *C08K 2003/2251* (2013.01); *C08L 2310/00* (2013.01)

(58) Field of Classification Search
CPC .......... C08L 77/00; C08K 3/04; C08K 3/2279
See application file for complete search history.

(56) References Cited

U.S. PATENT DOCUMENTS

| | | | |
|---|---|---|---|
| 2013/0106659 A1* | 5/2013 | Yung | H05K 1/0373 524/424 |
| 2014/0002311 A1 | 1/2014 | Takano et al. | |
| 2014/0066560 A1* | 3/2014 | Stoppelmann | C08K 3/40 524/407 |
| 2014/0353543 A1 | 12/2014 | Wu et al. | |
| 2015/0175803 A1 | 6/2015 | Stoppelmann | |
| 2016/0215124 A1 | 7/2016 | Takano | |

FOREIGN PATENT DOCUMENTS

| | | |
|---|---|---|
| CN | 103906803 A | 7/2014 |
| CN | 104725847 A | 6/2015 |
| CN | 105518180 A | 4/2016 |
| CN | 105531309 A | 4/2016 |
| EP | 2 703 435 A1 | 3/2014 |
| JP | 2000-503817 A | 3/2000 |
| JP | 2004-534408 A | 11/2004 |
| JP | 2015-502418 A | 1/2015 |
| JP | 2015-134903 A | 7/2015 |
| WO | WO 2009/141800 A2 | 11/2009 |
| WO | WO 2012/128219 A1 | 9/2012 |
| WO | WO 2013/066663 A2 | 5/2013 |
| WO | WO 2013/177850 A1 | 12/2013 |
| WO | WO 2014/195889 A1 | 12/2014 |

OTHER PUBLICATIONS

Machine translation of JP2015134903 (Year: 2015).*
Extended European Search Report for European Application No. EP 19 76 0337.6. dated Oct. 12, 2021.
International Preliminary Report on Patentability and Written Opinion of the International Searching Authority (Forms PCT/IB/373, and PCT/ISA/237) for International Application No. PCT/JP2019/006933, dated Aug. 27, 2020, with English translation of the Written Opinion.
Chinese Office Action and Search Report for corresponding Chinese Application No. 201980015582.1, dated Dec. 31, 2021, with an English translation.

* cited by examiner

*Primary Examiner* — Wenwen Cai
(74) *Attorney, Agent, or Firm* — Birch, Stewart, Kolasch & Birch, LLP (57) ABSTRACT

A thermoplastic resin composition contains 10 to 90% by mass of (A) thermoplastic resin; 1 to 20% by mass of (B) laser direct structuring additive; and 0.3 to 7.0% by mass of (D) graphite, a total of the ingredient (A), the ingredient (B) and the ingredient (D) being always kept at 100% by mass or below, and a ratio by mass given by ingredient (B)/ ingredient (D) being 1.0 to 20.

19 Claims, 1 Drawing Sheet

THERMOPLASTIC RESIN COMPOSITION, MOLDED ARTICLE, METHOD FOR MANUFACTURING THERMOPLASTIC RESIN COMPOSITION, AND, METHOD FOR MANUFACTURING PLATED MOLDED ARTICLE

TECHNICAL FIELD

This invention relates to a thermoplastic resin composition, a molded article, a method for manufacturing a thermoplastic resin composition, and, a method for manufacturing a plated molded article, and particularly to a thermoplastic resin composition and so forth, which are applicable to laser direct structuring (may occasionally be referred to as "LDS", hereinafter) technology capable of forming a plating layer directly on the surface of a molded article.

BACKGROUND ART

Keeping pace with development in mobile phones including smartphone, a variety of methods for fabricating antennas within the mobile phones have been investigated. In particular, there is a need for fabricating antennas with a three-dimensional design. Laser direct structuring (occasionally referred to as "LDS", hereinafter) technology has attracted public attention, as one known technology for fabricating such three-dimensional antenna. LDS is a technology for forming a plating layer, by irradiating laser on the surface of a molded article (resin molded article) that contains LDS additive, to thereby activate the irradiated area, and by applying a metal to the thus activated area. An advantage of the technology resides in capability of fabricating a metal structure such as antenna, directly onto the surface of a resin base, without using an adhesive or the like. The LDS technology is disclosed for example in Patent Literatures 1 to 4.

CITATION LIST

Patent Literature

[Patent Literature 1] JP-A-2000-503817
[Patent Literature 2] JP-A-2004-534408
[Patent Literature 3] WO2009/141800
[Patent Literature 4] WO2012/128219

SUMMARY OF THE INVENTION

Technical Problem

While the LDS technology has been widely employed as described above, the resin is required, depending on applications, to be adaptable to wide range of laser conditions. Mobile equipment in an increasing trend of communication/process speed has pushed up the frequency band they use, so that the resin is also required to demonstrate good performance in higher frequency bands on the order of several gigahertz.

The resin, particularly intended for use as a base of antenna of such mobile equipment, is required to have large dielectric constant, but on the other hand small dielectric loss (dielectric loss tangent).

It is therefore an object of this invention to collectively solve these problems, and to provide a thermoplastic resin composition adaptable to wide range of laser conditions for forming thereon a plating layer, while retaining high platability (good appearance of plating), and capable of achieving large dielectric constant and low dielectric loss tangent in higher frequency bands, as well as a molded article, a method for manufacturing such thermoplastic resin composition, and, a method for manufacturing a plated molded article.

Solution to Problem

The present inventors conducted diligent research under these situation, and as a result, discovered that the above-mentioned problems could be solved by blending a proper amount of graphite, and with the LDS additive controlled to the additive amount of graphite or larger in the thermoplastic resin composition.

Specifically, the problems described above are solved by the following means<1>, and preferably by the following means<2> to <16>.

<1> A thermoplastic resin composition comprising: 10 to 90% by mass of (A) thermoplastic resin; 1 to 20% by mass of (B) laser direct structuring additive; and 0.3 to 7.0% by mass of (D) graphite, a total of the ingredient (A), the ingredient (B) and the ingredient (D) being always kept at 100% by mass or below, and a ratio by mass given by ingredient (B)/ingredient (D) being 1.0 to 20.

<2> The thermoplastic resin composition of <1>, wherein the (D) graphite is flaky.

<3> The thermoplastic resin composition of <1> or <2>, further comprising 60% by mass or less of (C) inorganic reinforcing fiber, wherein the (C) inorganic reinforcing fiber is a glass fiber.

<4> The thermoplastic resin composition of any one of <1> to <3>, further comprising 10% by mass or more and 60% by mass or less of (C) inorganic reinforcing fiber.

<5> The thermoplastic resin composition of any one of <1> to <4>, wherein the (A) thermoplastic resin contains a xylylenediamine-based polyamide resin that is composed of a diamine-derived structural unit and a dicarboxylic acid-derived structural unit, 50 mol % or more of the diamine-derived structural unit being derived from xylylenediamine.

<6> The thermoplastic resin composition of any one of <1> to <4>, wherein the (A) thermoplastic resin contains a polycarbonate resin.

<7> The thermoplastic resin composition of any one of <1> to <6>, wherein the (B) laser direct structuring additive contains a metal oxide that contains antimony and tin.

<8> The thermoplastic resin composition of any one of <1> to <6>, wherein the (B) laser direct structuring additive contains copper chromium oxide.

<9> The thermoplastic resin composition of any one of <1> to <6>, wherein (B) laser direct structuring additive contains a conductive oxide that contains aluminum and zinc and has a resistivity of $5 \times 10^3$ Ω·cm or smaller.

<10> A molded article formed of the thermoplastic resin composition described in any one of <1> to <9>.

<11> The molded article of <10>, having on a surface thereof a plating layer.

<12> The molded article of <11>, wherein the plating layer has an antenna performance.

<13> The molded article of any one of <10> to <12>, being a mobile electronic equipment component.

<14> The molded article of any one of <10> to <12>, being a sensor component.

<15> A method for manufacturing the thermoplastic resin composition described in any one of <1> to <9>, the method comprising preparing a masterbatch of the (D) graphite using a thermoplastic resin, and then kneading the masterbatch with other ingredients.

<16> A method for manufacturing a plated molded article, the method comprising irradiating laser light on a molded article formed of the thermoplastic resin composition described in any one of <1> to <9>, and then applying a metal to form a plating layer.

Advantageous Effects of Invention

According to this invention, it became possible to provide a thermoplastic resin composition adaptable to wide range of laser conditions for forming thereon a plating layer, while retaining high platability (good appearance of plating), and capable of achieving large dielectric constant and low dielectric loss tangent in higher frequency bands, as well as a molded article, a method for manufacturing such thermoplastic resin composition, and, a method for manufacturing a plated molded article.

DESCRIPTION OF EMBODIMENTS

This invention will be detailed below. Note that all numerical ranges given in this patent specification, using "to" preceded and succeeded by numerals, are used to represent the ranges including these numerals respectively as the lower and upper limit values.

The thermoplastic resin composition of this invention contains 10 to 90% by mass of (A) thermoplastic resin, 1 to 20% by mass of (B) laser direct structuring additive, and 0.3 to 7.0% by mass of (D) graphite, a total of the ingredient (A), the ingredient (B) and the ingredient (D) is always kept at 100% by mass or below, and a ratio by mass given by ingredient (B)/ingredient (D) is 1.0 to 20. With such structure, obtainable is a thermoplastic resin composition that is adaptable to wide range of laser conditions for forming thereon a plating layer, while retaining high platability (good appearance of plating), and is capable of achieving large dielectric constant and low dielectric loss tangent in higher frequency bands.

The mechanism is presumably as follows. That is, blending with graphite makes the thermoplastic resin composition more easily absorb laser light, and more adaptable to wide range of laser conditions. A large amount of blending of graphite, however, degrades the platability (good appearance of plating) per se, like the case where other carbon filler were blended. In this invention, the aforementioned problem was presumably solved by suitably controlling the lower and upper limit values of the amount of blending of graphite, and by suppressing the amount of blending of graphite in the composition not more than the amount of bending of the LDS additive.

In particular, even a small amount of addition of the carbon filler such as carbon black has been known to degrade the platability, and this emphasizes an amazing effect of this invention.

In addition, the thermoplastic resin composition of this invention, having optimized chemical composition, can achieve large dielectric constant and low dielectric loss tangent in higher frequency bands.

Moreover, a limited amount of use of graphite can keep insulating property (for example, resistivity of $10^{14}$ Ω·cm or larger) of the resin composition.

<(A) Thermoplastic Resin>

The thermoplastic resin composition of this invention contains a thermoplastic resin.

The thermoplastic resin used in this invention is preferably selected from polyamide resin, polycarbonate resin, polyester resin, polyolefin resin, polypropylene resin, styrene-based resin, polyethylene resin and acrylic resin. Among them, polyamide resin, polycarbonate resin and styrene-based resin are preferred, polyamide resin and polycarbonate resin are more preferred, and polyamide resin is furthermore preferred.

«Polyamide Resin»

The polyamide resin is a polymer having acid amide as a structural unit and obtainable by ring-opening polymerization of lactam, polycondensation of aminocarboxylic acid, polycondensation of diamine and dibasic acid and so forth, being specifically exemplified by polyamides 6, 11, 12, 46, 66, 610, 612, 6I, 6/66, 6T/6I, 6/6T, 66/6T and 66/6T/6I; polyamide MX; polytrimethylhexamethylene terephthalamide; polybis(4-aminocyclohexyl)methane dodecamide, polybis(3-methyl-4-aminocyclohexyl)methane dodecamide, and polyundecamethylene hexahydroterephthalamide. Note that "I" represents isophthalate component, and "T" represents terephthalate component. Descriptions on polyamide resin in paragraphs [0011] to [0013] of JP-A-2011-132550 may be referred to, the contents of which are incorporated by reference into this patent specification.

The polyamide resin used in this invention is preferably a xylylenediamine-based polyamide resin that is composed of a diamine-derived structural unit and a dicarboxylic acid-derived structural unit, in which 50 mol % or more of the diamine-derived structural unit is derived from xylylenediamine. In the xylylenediamine-based polyamide resin, more preferably 70 mol % or more of the diamine-derived structural unit is derived from at least one of metaxylylenediamine and paraxylylenediamine, in which the percentage is even more preferably 80 mol % or more, yet more preferably 90 mol % or more, and furthermore preferably 95 mol % or more. Xylylenediamine preferably contains at least paraxylylenediamine, in which paraxylylenediamine may account for 20 mol % or more of xylylenediamine, paraxylylenediamine may even account for 50 mol % or more of xylylenediamine, and paraxylylenediamine may furthermore account for 70 mol % or more of xylylenediamine. Preferably 50 mol % or more of the dicarboxylic acid-derived structural unit in the xylylenediamine-based polyamide resin is derived from straight chain aliphatic α,ω-dicarboxylic acid having 4 to 20 carbon atoms, in which the percentage is more preferably 70 mol % or more, even more preferably 80 mol % or more, yet more preferably 90 mol % or more, and furthermore preferably 95 mol % or more. For the straight chain aliphatic α,ω-dibasic acid having 4 to 20 carbon atoms, suitably employable are sebacic acid, suberic acid, dodecanedioic acid, and eicosanedioic acid, among which adipic acid and sebacic acid are more preferred, and sebacic acid is even more preferred.

Diamine that is employable as a starting diamine component of the xylylenediamine-based polyamide resin, but other than metaxylylenediamine and paraxylylenediamine, is exemplified by aliphatic diamines such as tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethylhexamethylenediamine, and 2,4,4-trimethylhexamethylenediamine; alicyclic diamines such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decalin, and bis(aminomethyl)tricyclodecane; and aromatic ring-containing diamines such as bis(4-aminophenyl) ether, paraphenylenediamine, and bis(aminomethyl)naphthalene. Any one of them may be used, or two or more of them may be used in a mixed manner.

Dicarboxylic acid component, other than the straight-chain $\alpha,\omega$-dicarboxylic acid having 4 to 20 carbon atoms, is exemplified by phthalic acid compound such as isophthalic acid, terephthalic acid, and orthophthalic acid; and isomers of naphthalenedicarboxylic acids such as 1,2-naphthalenedicarboxylic acid, 1,3-naphthalenedicarboxylic acid, 1,4-naphthalenedicarboxylic acid, 1,5-naphthalenedicarboxylic acid, 1,6-naphthalenedicarboxylic acid, 1,7-naphthalenedicarboxylic acid, 1,8-naphthalenedicarboxylic acid, 2,3-naphthalenedicarboxylic acid, 2,6-naphthalenedicarboxylic acid, and 2,7-naphthalenedicarboxylic acid. Any one kind of them may be used, or two or more kinds of them may be used in a combined manner.

«Polycarbonate Resin»

The polycarbonate resin is not specifically limited, for which any of aromatic polycarbonate, aliphatic polycarbonate and aromatic-aliphatic polycarbonate may be used. Among them, more preferred is aromatic polycarbonate, and even more preferred is polymer or copolymer of thermoplastic aromatic polycarbonate obtainable by allowing aromatic dihydroxy compound to react with phosgene or carbonate diester.

The aromatic dihydroxy compound is exemplified by 2,2-bis(4-hydroxyphenyl)propane (=bisphenol A), tetramethyl bisphenol A, bis(4-hydroxyphenyl)-p-diisopropylbenzene, hydroquinone, resorcinol, and 4,4-dihydroxybiphenyl, and preferably exemplified by bisphenol A. For the purpose of preparing a compound having high flame retardance, also employable for example is the aforementioned aromatic dihydroxy compound having one or more tetraalkylphosphonium sulfonates bound thereto, or a polymer or oligomer having a siloxane structure terminated on both ends by phenolic hydroxy group.

Preferred examples of the polycarbonate resin used in this invention include polycarbonate resin derived from 2,2-bis(4-hydroxyphenyl)propane; and polycarbonate copolymer derived from 2,2-bis(4-hydroxyphenyl)propane and other aromatic dihydroxy compound.

Methods of manufacturing the polycarbonate resin is not specifically limited, so that polycarbonate resins manufactured either by the phosgene process (interfacial polymerization) or the fusion process (transesterification) may be used. In this invention, also usable is a polycarbonate resin manufactured by a typical fusion process followed by a process of controlling the content of terminal hydroxy groups.

The polycarbonate resin usable in this invention includes not only a polycarbonate resin as a virgin material, but also a polycarbonate resin regenerated from used products, that is, so-called material-recycled polycarbonate resin.

Regarding other polycarbonate resins usable in this invention, for example the description in paragraphs [0018] to [0066] of JP-A-2012-072338, and paragraphs [0011] to [0018] of JP-A-2015-166460 may be referred to, the contents of which are incorporated into the present specification.

«Polyester Resin»

The polyester resin is exemplified by polyethylene terephthalate resin and polybutylene terephthalate resin.

As is commonly known, polyethylene terephthalate resin and polybutylene terephthalate resin have been mass-produced by allowing terephthalic acid or ester thereof to react with ethylene glycol or 1,4-butanediol, and have been marketed. In this invention, such commercially available resins may be used. Although some of the commercially available resins might contain copolymerizable components other than terephthalic acid component and 1,4-butanediol component or ethylene glycol component, this invention can even employ the resin containing a small amount of such copolymerizable component, whose content is typically 10% by weight or less, and preferably 5% by weight or less.

The polyethylene terephthalate resin preferably has an intrinsic viscosity of typically 0.4 to 1.0 dL/g, and particularly preferably 0.5 to 1.0 dL/g. The intrinsic viscosity above the lower limit value makes the resin composition less likely to degrade the mechanical properties, meanwhile the intrinsic viscosity below the upper limit value makes the resin composition more easily keep the fluidity. Note that all intrinsic viscosity values are measured in a phenol/tetrachloroethane (ratio by mass=1/1) mixed solvent at 30° C.

The polybutylene terephthalate resin has an intrinsic viscosity of typically 0.5 to 1.5 dL/g, and particularly 0.6 to 1.3 dl/g. The intrinsic viscosity above the lower limit value makes it easier to obtain a resin composition that excels in mechanical strength. Meanwhile, with the intrinsic viscosity below the upper limit value, the resin composition will be more likely to have improved moldability without degrading the fluidity. The terminal carboxy group content is preferably 30 meq/g or less.

The polybutylene terephthalate resin may be polybutylene terephthalate resin modified with copolymer, in which such copolymer is specifically exemplified by polyester ether resins copolymerized with polyalkylene glycol especially with polytetramethylene glycol; dimer acid-copolymerized polybutylene terephthalate resin; and isophthalate-copolymerized polybutylene terephthalate resin. Note that these copolymers are defined by those whose amount of copolymerization is 1 mol % or more and less than 50 mol % of the total segment of the polybutylene terephthalate resin. More specifically, the amount of copolymer is preferably 2 to 50 mol %, more preferably 3 to 40 mol %, and particularly 5 to 20 mol %. Descriptions in paragraphs [0014] to [0022] of JP-A-2019-006866 may be referred to, the contents of which are incorporated by reference into this patent specification.

Descriptions on the other aspects of polyester resin in paragraphs [0013] to [0016] of JP-A-2010-174223 may be referred to, the contents of which are incorporated by reference into this patent specification.

The thermoplastic resin composition used in this invention may contain one kind of the thermoplastic polyester resin, or may contain two or more kinds.

«Styrene-Based Resin»

The styrene-based resin means at least one polymer species selected from the group consisting of styrene-based polymer composed of styrene-based monomers; copolymer formed by styrene-based monomer and other copolymerizable vinyl-based monomer; and copolymer obtained by polymerizing styrene-based monomer or styrene-based monomer with other copolymerizable vinyl-based monomer, under the presence of a rubbery polymer. Among them, a product having the rubbery polymer copolymerized therein is preferred.

The rubbery polymer copolymerizable with the styrene-based monomer is exemplified by polybutadiene, polyisoprene, styrene-butadiene random copolymer and block copolymer, acrylonitrile-butadiene random copolymer and block copolymer, acrylonitrile-butadiene copolymer, copolymer of butadiene with alkyl acrylate or alkyl methacrylate, polybutadiene-polyisoprene-diene-based copolymer, ethylene-isoprene random copolymer and block copolymer, copolymer of ethylene and α-olefin such as ethylene-butene random copolymer and block copolymer, ethylene-methacrylate copolymer, copolymer of ethylene and α,β-unsaturated carboxylate ester such as ethylene-butyl acrylate copolymer, ethylene-vinyl acetate copolymer, ethylene-propylene-unconjugated terpolymer such as ethylene-propylene-hexadiene copolymer, acrylic rubber, and composite rubber composed of polyorganosiloxane rubber combined with polyalkyl acrylate or methacrylate rubber.

Descriptions on styrene-based resin in paragraphs [0019] to [0029] in JP-A-2015-166460 may be referred to, the contents of which are incorporated by reference into this patent specification.

The thermoplastic resin composition used in this invention may contain one kind of the styrene-based resin, or may contain two or more kinds.

«Other Resin, Etc.»

Descriptions on other thermoplastic resin in paragraphs [0011] to [0028] of JP-A-2014-074162 may be referred to, the contents of which are incorporated by reference into this patent specification.

A first embodiment of the thermoplastic resin of this invention relates to an embodiment in which polyamide resin accounts for 90% by mass or more of the thermoplastic resin, and preferably xylylenediamine-based polyamide resin accounts for 90% by mass or more.

A second embodiment of the thermoplastic resin of this invention relates to an embodiment in which polycarbonate resin accounts for 90% by mass or more of the (A) thermoplastic resin.

A third embodiment of the thermoplastic resin of this invention relates to an embodiment in which polycarbonate resin accounts for 85 to 65% by mass, and styrene-based resin (particularly rubber-based resin such as ABS resin) accounts for 15 to 35% by mass, of the (A) thermoplastic resin. Total of the polycarbonate resin and the styrene-based resin is preferably 90% by mass or more of the thermoplastic resin.

A fourth embodiment of the thermoplastic resin of this invention relates to an embodiment in which polycarbonate resin accounts for 85 to 65% by mass, and polyester resin (particularly polyethylene terephthalate) accounts for 15 to 35% by mass, of the (A) thermoplastic resin. Total of the polycarbonate resin and the polyester resin is preferably 90% by mass or more of the thermoplastic resin.

A fifth embodiment of the thermoplastic resin of this invention relates to an embodiment in which polybutylene terephthalate accounts for 15 to 45% by mass, isophthalate-modified polybutylene terephthalate accounts for 15 to 45% by mass, and polyamide resin (particularly aliphatic polyamide resin) accounts for 70 to 10% by mass, of the (A) thermoplastic resin. Total of the polybutylene terephthalate and the isophthalate-modified polybutylene terephthalate and the polyamide resin is preferably 90% by mass or more.

The thermoplastic resin composition of this invention preferably contains 10% by mass or more of the thermoplastic resin, the percentage is more preferably 30% by mass or larger, and even more preferably 50% by mass or larger. Meanwhile, the thermoplastic resin composition of this invention contains 90% by mass or less of the thermoplastic resin, the percentage is more preferably 85% by mass or smaller.

The thermoplastic resin composition of this invention may contain one kind of the thermoplastic resin, or two or more kinds. When two or more kinds are contained, the total content preferably falls within the aforementioned ranges.

<(B) Laser Direct Structuring Additive>

The thermoplastic resin composition of this invention contains the laser direct structuring (LDS) additive.

The LDS additive in this invention means a compound that enables the thermoplastic resin to have a plating layer formed thereon, when 10 parts by weight of an additive expected to be the LDS additive is added to 100 parts by weight of the thermoplastic resin, the resin is then irradiated with YAG laser of 1064 nm wavelength at an output of 18 W, a frequency of 80 kHz, and a speed of 3 m/s, and then subjected to electroless plating using an M-Copper 85 plating bath (from MacDermid Performance Solutions) so as to apply a metal to the laser-irradiated area. The LDS additive used in this invention may either be synthetic one or commercially available one. The commercially available ones are not always necessarily be those marketed as the LDS additive, but may be substances intended for other applications so long as they satisfy the requirement for the LDS additive in this invention. Only a single kind of the LDS additive may be used, or two or more kinds thereof may be used in a combined manner.

A first embodiment of the LDS additive used in this invention relates to copper chromium oxide. The LDS additive of the first embodiment preferably contains 10 to 30% by weight of copper, and 15 to 50% by weight of chromium.

Copper chromium oxide preferably has a spinel structure. The spinel structure is one of representative crystal structures found in $AB_2O_4$-type compound (A and B represent metal elements) that belongs to double oxide.

A first embodiment of the LDS additive (copper chromium oxide) may contain other trace metal. Such other metal is exemplified by antimony, tin, lead, indium, iron, cobalt, nickel, zinc, cadmium, silver, bismuth, arsenic, manganese, magnesium and calcium, among which manganese is preferred. These metals may exist in the form of oxide.

A preferred example of the LDS additive of the first embodiment is an LDS additive containing 10% by mass or less of metal oxide other than the copper chromium oxide.

A second embodiment of the LDS additive used in this invention relates to a metal oxide that contains at least one of antimony or phosphorus, together with tin, and is preferably a metal oxide that contains antimony and tin.

The LDS additive of the second embodiment is preferably such that the tin content is larger than the phosphorus and antimony contents, and more preferably such that the tin content accounts for 80% by weight or more of the total content of tin and phosphorus and antimony.

In particular, the LDS additive of the second embodiment is preferably a metal oxide in which the tin content accounts for 80% by mass or more, relative to the total of tin and antimony More specifically, the LDS additive of the second embodiment is exemplified by antimony-doped tin oxide, antimony oxide-doped tin oxide, phosphorus-doped tin oxide, and phosphorus oxide-doped tin oxide, among which antimony-doped tin oxide and antimony oxide-doped tin oxide are preferred, and antimony oxide-doped tin oxide is more preferred.

The LDS additive of a third embodiment used in this invention preferably contains a conductive oxide that contains at least two kinds of metal and has a resistivity of $5\times10^3$ Ω·cm or smaller. The conductive oxide preferably has a resistivity of $8\times10^2$ Ω·cm or smaller, more preferably $7\times10^2$ Ω·cm or smaller, and even more preferably $5\times10^2$ Ω·cm or smaller. The lower limit may be, but not specifically limited to, $1\times10^1$ Ω·cm or above for example, and further may be $1\times10^2$ Ω·cm or above.

The resistivity of the conductive oxide in this invention is typically given by powder resistivity, which can be measured using a tester "Model 3223" from Yokogawa Electric Corporation, by placing 10 g of fine powder of the conductive oxide into a cylinder having an inner diameter of 25 mm, with an inner Teflon (registered trademark) lining, and then by pressurizing the powder at 100 kg/cm$^2$ (packing ratio=20%).

Although the LDS additive used in the third embodiment is not specifically limited so long as it contains the conductive oxide having a resistivity of $5\times10^3$ Ω·cm or smaller, it preferably contains at least two kinds of metal, and more preferably contains Group n (n is an integer of 3 to 16) metal and Group (n+1) metal in the periodic table. n preferably represents an integer of 10 to 13, and more preferably 12 or 13. That is, one example of the LDS additive used in the third embodiment relates to a conductive oxide that contains aluminum and zinc, and having a resistivity of $5\times10^3$ Ω·cm or smaller.

In the LDS additive used in the third embodiment, assuming now the total content of the Group n (n is an integer of 3 to 16) metal and the Group (n+1) metal in the periodic table as 100 mol %, the content of either one metal is preferably 15 mol % or less, more preferably 12 mol % or less, and particularly 10 mol % or less. The lower limit is preferably, but not specially limited to, 0.0001 mol % or above. With the contents of two or more metals controlled within these ranges, the platability can be improved. In this invention, Group (n+1) metal-doped Group n metal oxide is particularly preferred.

Moreover, in the LDS additive used in the third embodiment, the Group n metal and the Group (n+1) metal in the periodic table preferably account for 98% by mass or more of metal component contained in the LDS additive.

The Group n metals in the periodic table are exemplified by those in Group 3 (scandium, yttrium), Group 4 (titanium, zirconium, etc.), Group 5 (vanadium, niobium, etc.), Group 6 (chromium, molybdenum, etc.), Group 7 (manganese, etc.), Group 8 (iron, ruthenium, etc.), Group 9 (cobalt, rhodium, iridium, etc.), Group 10 (nickel, palladium, platinum), Group 11 (copper, silver, gold, etc.), Group 12 (zinc, cadmium, etc.), Group 13 (aluminum, gallium, indium, etc.), Group 14 (germanium, tin, etc.), Group 15 (arsenic, antimony, etc.), and Group 16 (selenium, tellurium, etc.). Among them, Group 12 (n=12) metals are preferred, and zinc is more preferred.

The Group n+1 metals in the periodic table are exemplified by those in Group 4 (titanium, zirconium, etc.), Group 5 (vanadium, niobium, etc.), Group 6 (chromium, molybdenum, etc.), Group 7 (manganese, etc.), Group 8 (iron, ruthenium, etc.), Group 9 (cobalt, rhodium, iridium, etc.), Group 10 (nickel, palladium, platinum), Group 11 (copper, silver, gold, etc.), Group 12 (zinc, cadmium, etc.), Group 13 (aluminum, gallium, indium, etc.), Group 14 (germanium, tin, etc.), Group 15 (arsenic, antimony, etc.), and Group 16 (selenium, tellurium, etc.). Among them, metals in Group 13 (n+1=13) are preferred, aluminum or gallium is more preferred, and aluminum is even more preferred.

The LDS additive used in the third embodiment may contain a metal other than the conductive metal oxide. The metal other than the conductive oxide is exemplified by antimony, titanium, indium, iron, cobalt, nickel, cadmium, silver, bismuth, arsenic, manganese, chromium, magnesium, and calcium. These metals may exist in the form of oxide. The content of each of these metals is preferably 0.01% by mass or less relative to the LDS additive.

The thermoplastic resin composition of this invention contains 1% by mass or more of the IDS additive, the percentage is preferably 3% by mass or larger, and more preferably 4% by mass or larger. Meanwhile, the thermoplastic resin composition of this invention contains 20% by mass or less of the LDS additive, the percentage is more preferably 17% by mass or smaller, and even more preferably 12% by mass or smaller.

The thermoplastic resin composition of this invention may contain one kind of the LDS additive, or two or more kinds. When two or more kinds are contained, the total content preferably falls within the aforementioned ranges.

<(C) Inorganic Reinforcing Fiber>

The thermoplastic resin composition of this invention preferably contains an inorganic reinforcing fiber.

The inorganic reinforcing fiber is exemplified by carbon fiber and glass fiber. Glass fiber is preferably contained.

The inorganic reinforcing fiber in this invention means fibrous organic material, and more specifically, preferably has a chopped form in which 1,000 to 10,000 strands of inorganic reinforcing fiber are sized and cut into a predetermined length.

The inorganic reinforcing fiber in this invention preferably has a number average fiber length (cut length) of 0.5 to 10 mm, which is more preferably 1 to 5 mm. With the inorganic reinforcing fiber having such number average fiber length, the mechanical strength may further be improved. The number average fiber length can be determined by randomly selecting the inorganic reinforcing fibers to be measured regarding the fiber length on an image observed under an optical microscope, by measuring the long side, and by averaging the measured values. Magnification of observation is set to 20×, and the number of fibers to be observed is set to 1,000 or larger. The number average fiber length is approximately equivalent to the cut length.

The inorganic reinforcing fiber may have any cross-sectional shape selected from circle, oval, oblong circle, rectangle, rectangle combined with semicircles at both short sides, cocoon and so forth.

The lower limit of the number average fiber diameter of the inorganic reinforcing fiber is preferably 4.0 μm or above, more preferably 4.5 μm or above, and even more preferably 5.0 μm or above. The upper limit of the number average fiber diameter of the inorganic reinforcing fiber is preferably 15.0 μm or below, and more preferably 12.0 μm or below. With the inorganic reinforcing fiber having the number average fiber diameter controlled within these ranges, obtainable is a molded article that further excels in the platability even after a wet heat process. The molded article can retain the platability at a high level, even after stored or annealed for a long period. Note that the number average fiber diameter of the inorganic reinforcing fiber can be determined by randomly selecting the glass fibers to be measured regarding the diameter on an image observed under an electron microscope, by measuring the diameter at the near center of the fiber, and by averaging the measured values. Magnification of observation is set to 1,000×, and the number of fibers to be observed is set to 1,000 or larger. The number average fiber diameter of glass fiber having a cross-sectional shape other than circle is determined after converting the cross section into a circle having the same area.

Next, the glass fiber suitably used in this invention will be explained.

The glass fiber employable here may be any fiber melt-spun from commonly marketed glasses such as E-glass, C-glass, A-glass, S-glass and alkali-resistant glass, which are not specifically limited so long as they can be spun into glass fiber. In this invention, E-glass is preferably contained. The glass fiber used in this invention is preferably treated on the surface thereof with a surface treatment agent such as silane coupling agent exemplified by γ-methacryloxypropyltrimethoxysilane, γ-glycidoxypropyltrimethoxysilane, and γ-aminopropyltriethoxysilane. Amount of adhesion of the surface treatment agent is preferably 0.01 to 1% by mass of the glass fiber. It is also preferable to use the glass fiber further optionally treated with lubricant such as aliphatic acid amide or silicone oil; antistatic agent such as quaternary ammonium salt; film-forming resin such as epoxy resin and urethane resin; and a mixture the film-forming resin with heat stabilizer, flame retardant and so forth. The glass fiber used in this invention may be sized with a sizing agent. The sizing agent in this case is preferably epoxy-based sizing agent or urethane-based sizing agent.

The glass fiber is commercially available. Commercial products include T187, T286H, T756H and T289H from Nippon Electric Glass Co., Ltd., DEFT2A from Owens Co/fling, HP3540 from PPG Industries, and CSG3PA820 from Nitto Boseki Co., Ltd.

The thermoplastic resin composition of this invention, when containing the inorganic reinforcing fiber, preferably contains 10% by mass or more thereof, the content is more preferably 20% by mass or more, and even more preferably 25% by mass or more. The thermoplastic resin composition of this invention preferably contains 60% by mass or less of the inorganic reinforcing fiber, the content is more preferably 50% by mass or less, and even may be 40% by mass or less.

The thermoplastic resin composition of this invention may contain only one kind of the inorganic reinforcing fiber, or may contain two or more kinds. When two or more kinds are contained, the total content preferably falls within the aforementioned ranges.

The thermoplastic resin composition of this invention is also preferably designed to contain substantially no inorganic reinforcing fiber. The phrase stating " . . . contain substantially no . . . " means that the content of the inorganic reinforcing fiber is less than 10% by mass of the composition, where the content is preferably 5% by mass or less, and more preferably 1% by mass or less.

<(D) Graphite>

The thermoplastic resin composition of this invention contains graphite.

Graphite, also occasionally referred to as black lead or plumbago, is a material composed of carbon, and has a hexagonal crystal structure. Graphite may be either natural graphite or synthetic graphite, and also include graphene. Graphite is marketed, for example, by Nippon Graphite Fiber Corporation and Ito Graphite Co., Ltd.

In contrast, carbon black, also being a material composed of carbon, has irregular shape or amorphous structure, and is therefore not classified into graphite.

Graphite preferably has a flaky form. The flaky form conceptually encompasses scaly form. Use of the flaky graphite allows the effect of this invention to be demonstrated more effectively.

The graphite preferably has a number average particle diameter of 1 to 100 μm, which is more preferably 3 to 50 μm, and even more preferably 5 to 30 μm. For any graphite other than flaky or particulate ones, the number average particle diameter is determined by number average length of the longest part. The number average particle diameter of graphite can be determined by randomly selecting graphite to be measured regarding the diameter on an image observed under an electron microscope, by measuring the particle diameter, and by averaging the measured values. Magnification of observation is set to 1,000×, and the number of measured particles is set to 1,000 or larger. The diameter of graphite is given by circle-equivalent diameter measured in the aforementioned microscopic observation, and a number-averaged value was employed as the number average particle diameter.

The thermoplastic resin composition of this invention contains 0.3% by mass or more of graphite, the content is more preferably 0.5% by mass or more, and even more preferably 0.6% by mass or more. Meanwhile, the thermoplastic resin composition of this invention contains 7.0% by mass or less of graphite, the content is more preferably 6.0% by mass or less, even more preferably 5.0% by mass or less, and may even be 3.0% by mass or less.

The thermoplastic resin composition of this invention may contain only one kind of graphite, or may contain two or more kinds. When two or more kinds are contained, the total content preferably falls within the aforementioned ranges.

The thermoplastic resin composition of this invention is also preferably designed to contain substantially no carbon filler other than graphite. The phrase stating " . . . contain substantially no . . . " means that the content of the carbon filler other than graphite is less than 10% by mass of the graphite content, where the content is preferably 5% by mass or less, more preferably 3% by mass or less, and even more preferably 1% by mass or less.

The thermoplastic resin composition of this invention has a ratio by mass given by ingredient (B)/ingredient (D) of 1.0 to 20. With the ratio by mass controlled to 1.0 or larger, the plating layer may be formed under wide range of laser conditions. Meanwhile, with the ratio by mass controlled to 20 or smaller, good platability (good appearance of plating) may be retained. The ratio by mass given by ingredient (B)/ingredient (D) is preferably 1.5 or larger, more preferably 1.8 or larger, even more preferably 2.0 or larger, on the other hand, yet more preferably 15 or smaller.

<Mold Releasing Agent>

The thermoplastic resin composition of this invention may further contain a mold releasing agent. The mold releasing agent is used principally for improving productivity when molding the thermoplastic resin composition. The mold releasing agent is exemplified by aliphatic carboxamide-based compound, aliphatic carboxylic acid, metal aliphatic carboxylate, ester formed between aliphatic carboxylic acid and alcohol, aliphatic hydrocarbon having a number average molecular weight of 200 to 15000, polysiloxane-based silicone oil, ethylene bis stearamide, and disterayl ketone.

For details of the mold releasing agent, descriptions in paragraphs [0037] to [0042] of JP-A-2016-196563, and paragraphs [0048] to [0058] of JP-A-2016-078318 may be referred to, the contents of which are incorporated by reference into this patent specification.

The lower limit of content of the mold releasing agent, when blended, is preferably 0.001% by mass or above relative to the thermoplastic resin composition, more preferably 0.01% by mass or above, meanwhile the upper limit is preferably 2.0% by mass or below, and more preferably 1.5% by mass or below. Within these ranges, the mold releasing property may be improved, and die pollution during injection molding may be avoidable. Only one kind of the mold releasing agent may be used, or two or more kinds may be used in a combined manner. When two or more kinds are used, the total content preferably falls within the aforementioned ranges.

<Nucleating Agent>

The thermoplastic resin composition of this invention may further contain a nucleating agent. The nucleating agent, although not limited regarding the type, are preferably talc, boron nitride, mica, kaolin, calcium carbonate, barium sulfate, silicon nitride, potassium titanate and molybdenum disulfide, among which talc and boron nitride are more preferred, and talc is even more preferred. Blending of additional talc can make the plating layer grow faster. Blending of additional talc can also improve the platability of the molded article, even with a reduced content of LDS additive. Talc employable here may be treated on the surface thereof with at least one compound selected from polyorganohydrogensiloxanes and organopolysiloxnaes. In this case, the amount of adhesion of siloxane compound on talc is preferably 0.1 to 5% by mass relative to the talc.

The nucleating agent preferably has a number average particle diameter of 1 to 50 µm, which is more preferably 2 to 25 µm, and even more preferably 2 to 10 µm. For any nucleating agent other than flaky or particulate ones, the number average particle diameter is determined by number average length of the longest part. The number average particle diameter of talc can be determined by randomly selecting talc to be measured regarding the diameter on an image observed under an electron microscope, by measuring the diameter, and by averaging the measured values. Magnification of observation is set to 1,000×, and the number of measured particles is set to 1,000 or larger.

The thermoplastic resin composition of this invention, when containing the nucleating agent, preferably contains 0.01 to 10 parts by mass thereof, per 100 parts by mass of the thermoplastic resin, the content is more preferably 0.1 to 8 parts by mass, and even more preferably 0.1 to 5 parts by mass.

The thermoplastic resin composition of this invention may contain only one kind of the nucleating agent, or may contain two or more kinds. When two or more kinds are contained, the total content preferably falls within the aforementioned ranges.

<Stabilizer>

The thermoplastic resin composition of this invention preferably contains a stabilizers. The stabilizer is exemplified by various stabilizers including phosphorus-containing stabilizer, sulfur-containing stabilizers, and phenol-based stabilizers. Among which preferred are phosphorus-based stabilizers and phenol-based stabilizers, and particularly preferred is phenol-based stabilizers.

Among the phenol-based stabilizers, preferred are pentaerythritol tetrakis[3-(3,5-di-tert-butyl-4-hydroxyphenyl) propionate], and octadecyl-3-(3,5-di-tert-butyl-4-hydroxyphenyl) propionate. Such phenol-based stabilizers are specifically exemplified by "Irganox 1010" and "Irganox 1076" (product names, here and hereinafter) from BASF SE; and "ADEKASTAB AO-50" and "ADEKASTAB AO-60" from ADEKA Corporation.

The thermoplastic resin composition of this invention, when containing the stabilizer, preferably contains 0.01 to 5 parts by mass thereof, per 100 parts by mass of the thermoplastic resin, the content is even more preferably 0.05 to 3 parts by mass, and yet more preferably 0.1 to 1 parts by mass.

The thermoplastic resin composition of this invention may contain only one kind of the stabilizer, or may contain two or more kinds. When two or more kinds are contained, the total content preferably falls within the aforementioned ranges.

<Epoxy Compound>

The thermoplastic resin composition of this invention may contain an epoxy compound. The epoxy compound is preferably contained, particularly when polyester resin, which is preferably polybutylene terephthalate resin, is contained as the thermoplastic resin.

The epoxy compound serves as a compatibilizer, when two or more kinds of thermoplastic resin such as polyester resin and polyamide resin are blended, and improves the hydrolysis resistance.

The epoxy compound may only be a compound having one or more epoxy groups within a molecule, and may usually be a glycidyl compound which is a reaction product of alcohol, phenols or carboxylic acid with epichlorohydrin, or a compound having an epoxydated olefinic double bond.

Preferred specific examples of the epoxy compound are exemplified by bisphenol-type epoxy compounds such as bisphenol A-type epoxy compound and bisphenol F-type epoxy compound, resorcin-type epoxy compound, novolac-type epoxy compound, alicyclic diepoxy compound, glycidyl ethers, glycidyl esters, and epoxydated polybutadiene.

The alicyclic diepoxy compound is exemplified by vinylcyclohexene dioxide and dicyclopentadiene dioxide.

The glycidyl ethers are exemplified by monoglycidyl ethers such as methyl glycidyl ether, butyl glycidyl ether, 2-ethylhexyl glycidyl ether, decyl glycidyl ether, stearyl glycidyl ether, phenyl glycidyl ether, butyl phenylglycidyl ether, and allyl glycidyl ether; and, neopentyl glycol diglycidyl ether, ethylene glycol diglycidyl ether, glycerin diglycidyl ether, propylene glycol diglycidyl ether, and bisphenol A diglycidyl ether.

The glycidyl esters are exemplified by monoglycidyl esters such as glycidyl benzoate, and glycidyl sorbate; and, diglycidyl adipate, diglycidyl terephthalate, and diglycidyl orthophthalate.

The epoxy compound may be a copolymer having, as one ingredient thereof, a glycidyl group-containing compound, and is exemplified by copolymers formed by glydicyl ester of α,β-unsaturated acid, and one or two or more monomers selected from the group consisting of α-olefin, acrylic acid, acrylate ester, methacrylic acid, and methacrylate ester.

The epoxy compound preferably has an epoxy equivalent of 100 to 500 g/eq, and a number average molecular weight of 2,000 or smaller. With the epoxy equivalent controlled to 100 g/eq or larger, the resin composition will have a proper amount of epoxy group, and will suitably tend to lower the viscosity. With the epoxy equivalent controlled to 500 g/eq or smaller, the thermoplastic resin composition will tend to further improve the wet heat resistance. With the number average molecular weight controlled to 2,000 or smaller, the epoxy compound will be more compatible with the thermoplastic resin, and the molded article will tend to improve the mechanical strength.

Particularly preferred epoxy compounds are bisphenol A-type epoxy compound and novolac-type epoxy compound, which are obtainable by reaction of epichlorohydrin respectively with bisphenol A and novolac.

Content of the epoxy compound, per 100 parts by mass of the thermoplastic resin, is preferably 0.1 parts by mass or more, more preferably 0.2 parts by mass or more, may be 2.5 parts by mass or more, and even may be 2.8 parts by mass or more. Meanwhile, the upper limit value of the content is preferably 10 parts by mass or below, more preferably 8 parts by mass or below, even more preferably 6 parts by mass or below, and yet more preferably 5 parts by mass or below.

Only one kind of the epoxy compound may be contained, or two or more kinds may be contained. When two or more kinds are contained, the total content preferably falls within the aforementioned ranges.

<Other Ingredients>

The thermoplastic resin composition of this invention may contain other ingredient besides those described above. Such other ingredient is exemplified by alkali, elastomer, titanium oxide, antioxidant, hydrolysis resistance modifier, matting agent, UV absorber, plasticizer, dispersion aid, antistatic agent, anti-coloring agent, anti-gelling agent and colorant. Description on the details of these ingredients in paragraphs [0130] to [0155] of JP-B1-4894982 may be referred to, the contents of which are incorporated by reference into this patent specification. These ingredients preferably total 20% by mass or less of the thermoplastic resin composition. Only one kind of each of these ingredients may be used, or two or more kinds are used in a combined manner.

In the thermoplastic resin composition of this invention, the ingredient (A), the ingredient (B) and the ingredient (D), and the optional ingredient (C) and the other ingredient(s) add up to 100% by mass. In the thermoplastic resin composition of this invention, the total of the ingredient (A), the ingredient (B), the ingredient (C) and the ingredient (D) preferably accounts for 95% by mass or more of the composition, the percentage is more preferably 98% by mass or more.

A preferred example of the thermoplastic resin composition of this invention is such as containing 10 to 90% by mass of (A) thermoplastic resin, 1 to 20% by mass of (B) laser direct structuring additive, and 0.3 to 7.0% by mass of (D) graphite, the total of the ingredient (A), the ingredient (B) and the ingredient (D) being always kept at 100% by mass or below, a ratio by mass given by ingredient (B)/ingredient (D) being 1.0 to 20, further containing 10% by mass or more and 60% by mass or less of (C) inorganic reinforcing fiber, in which 70% by mass or more (preferably 90% by mass or more) of the ingredient (A) being composed of a diamine-derived structural unit and a dicarboxylic acid-derived structural unit, and 50 mol % or more of the diamine-derived structural unit being derived from xylylenediamine. This embodiment may also contain the mold releasing agent and/or the nucleating agent. Preferred ranges of the amount of blending of the individual ingredients are as described above.

Another preferred example of the thermoplastic resin composition of this invention is such as containing 10 to 90% by mass of (A) thermoplastic resin, 1 to 20% by mass of (B) laser direct structuring additive, and 0.3 to 7.0% by mass of (D) graphite, the total of the ingredient (A), the ingredient (B) and the ingredient (D) being always kept at 100% by mass or below, the ratio by mass given by ingredient (B)/ingredient (D) being 1.0 to 20, in which 90% by mass or more of the ingredient being a polycarbonate resin. This embodiment may also contain the inorganic reinforcing fiber (preferably glass fiber). Preferred ranges of the amount of blending of the individual ingredients are as described above.

Again another preferred example of the thermoplastic resin composition of this invention is such as containing 10 to 90% by mass of (A) thermoplastic resin, 1 to 20% by mass of (B) laser direct structuring additive, and 0.3 to 7.0% by mass of (D) graphite, and, the total of the ingredient (A), the ingredient (B) and the ingredient (D) being always kept at 100% by mass or below, the ratio by mass given by ingredient (B)/ingredient (D) being 1.0 to 20, in which 15 to 35% by mass of the ingredient (A) being a polyester resin and/or styrene-based resin, and 85 to 65% by mass of the ingredient (A) being a polycarbonate resin. This embodiment may also contain the inorganic reinforcing fiber (preferably glass fiber). Preferred ranges of amount of blending of the individual ingredients are as described above.

<Method for Manufacturing Thermoplastic Resin Composition>

Method for manufacturing the thermoplastic resin composition of this invention employable here is freely selectable.

An exemplary method is such as mixing the thermoplastic resin, the inorganic reinforcing fiber, the LDS additive, graphite and so forth using a mixing means such as a V-type blender to thereby prepare a batch blend, melt-kneading the batch blend in a vented extruder, and then pelletizing it. There is an alternative method known as two-stage kneading method, by which ingredients excluding the inorganic reinforcing fiber and graphite are thoroughly mixed in advance, the mixture is melt kneaded in a vented extruder and pelletized, the obtained pellets are mixed with a masterbatch that contains graphite and the inorganic reinforcing fiber, and the mixture is melt kneaded in a vented extruder.

In this invention, it is particularly preferable to prepare a masterbatch of (D) graphite using the thermoplastic resin, and then to mix it with the other ingredients, to thereby manufacture the thermoplastic resin composition. Graphite preliminarily given the form of masterbatch can be thoroughly dispersed into the thermoplastic resin. The thermoplastic resin used for preparing the masterbatch is preferably a thermoplastic resin in the same category with the (A) thermoplastic resin. Such same category of the thermoplastic resin is exemplified by combinations within polyamide resins, within polyester resins, within polyolefins, within polypropylene resins, within polyethylene resins, within acrylic resins, within styrene resins, and combination of polyamide resin and polyurethane resin.

A preferred screw structure in a kneading zone of an extruder has an element for promoting kneading arranged on the upstream side, and has a pressurizing element arranged on the downstream side.

The element for promoting kneading is exemplified by forward conveying kneading disk element, cross kneading disk element, backward conveying kneading disk element, wide kneading disk element, forward conveying mixing screw element, and backward conveying mixing screw element.

Heating temperature during the melt kneading is typically selectable in the range from 180 to 360° C. Excessively high temperature would make the decomposition gas more likely to produce, occasionally resulting in extrusion failure such as strand breakage. The screw structure is preferably selected taking, for example, shear heating into consideration. Use of an antioxidant or heat stabilizer is preferred in view of suppressing the decomposition during kneading or subsequent molding.

<Molded Article>

This invention also discloses a molded article formed of the thermoplastic resin composition of this invention.

Methods of manufacturing the resin molded article are not specifically limited, and any of molding methods having widely been used for thermoplastic resin is employable. The examples include injection molding, ultra-high-speed injection molding, injection compression molding, two color molding, hollow molding such as gas-assisted molding, molding using heat insulation dies, molding using rapid heating dies, foam molding (including supercritical fluid), insert molding, IMC (in-mold coating) molding, extrusion molding, sheet forming, thermoforming, rotational molding, laminate molding, press molding and blow molding. Also a molding process based on a hot-runner system is employable.

The molded article obtained by molding the thermoplastic resin composition of this invention is suitably used as a molded article (plated molded article) having a plating layer formed on the surface thereof. A preferred embodiment of the plating layer on the molded article of this invention has an antenna performance.

The molded article formed of the thermoplastic resin composition of this invention preferably has a dielectric constant (2.45 GHz) of 3.6 or larger, which is more preferably 4.0 or larger, and even more preferably 4.5 or larger. The upper limit value is practically, but not specifically limited to, 30 or below.

The molded article formed of the thermoplastic resin composition of this invention preferably has a dielectric loss tangent (2.45 GHz) of 0.040 or smaller, which is more preferably 0.030 or smaller, and even more preferably 0.025 or smaller. The lower limit value is practically, but not specifically limited to, 0.001 or above.

Note that values of the dielectric constant and dielectric loss tangent employed here are those measured by the methods described later in EXAMPLES.

<Method for Manufacturing Plated Molded Article>

Next paragraphs will disclose a method for manufacturing a plated molded article, the method including irradiating laser light on the surface of the molded article formed of the thermoplastic resin composition of this invention, and then applying a metal to form a plating layer.

Figure 1:
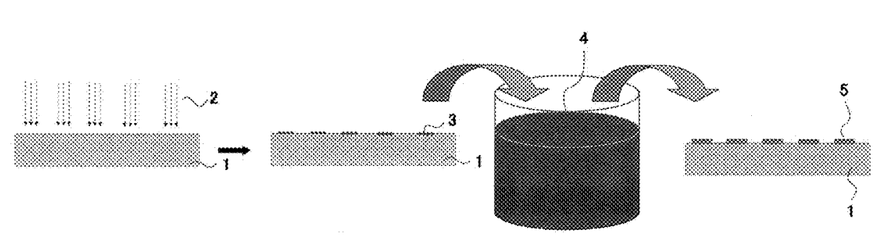
FIG. 1 A schematic drawing illustrating a step of providing a plating layer on the surface of a molded article.

FIG. 1 is a schematic drawing illustrating a step of forming a plating layer on the surface of a molded article 1, by the laser direct structuring technology. The molded article 1, illustrated in FIG. 1 as a flat substrate, is not always necessarily flat, and may partially or entirely be curved. The obtainable plated molded article is not always necessarily a final product, but may be any of various parts.

A first embodiment of the molded article involves a smooth surface. A prior process of forming the plating layer has involved rasping of the molded article formed of resin, so as to roughen the surface thereof in order to improve adhesiveness with the plating layer. In contrast, this invention can form the plating layer even on a smooth surface.

A second embodiment of the molded article involves an area thereof to be plated, which is not uniformly flat, more specifically having projection and/or recess. This invention, adaptable to wide range of laser conditions, can properly form the plating layer, even on the area to be plated, which is not uniformly flat.

Referring again back to FIG. 1, laser light 2 is irradiated on the molded article 1. The laser is suitably selectable, without special limitation, from known laser lights including YAG laser, excimer laser, and electromagnetic radiation, among which YAG laser is preferred. Also wavelength of the laser light is not specifically limited, and preferably ranges from 200 nm to 1,200 nm, and more preferably from 800 to 1,200 nm.

Upon irradiated with the laser light, the molded article 1 is activated only in an area 3 irradiated with the laser light. With the irradiated area thus activated, the molded article 1 is then immersed in a plating solution 4. The plating solution 4 is selectable from a wide range of known plating solutions, without special limitation, such as those (particularly electroless plating solutions) containing as the metal ingredient at least one of copper, nickel, silver, gold and palladium; among which more preferred are plating solution (particularly electroless plating solutions) containing at least one of copper, nickel, silver and gold; and among which further preferred is a plating solution containing copper. That is, the plating layer in this invention preferably contains the metal ingredient which is composed of at least one of the aforementioned metals.

Also there is no special limitation on the method for immersing the molded article 1 into the plating solution 4. An exemplary method is such as placing the molded article 1 into a liquid that contains the plating solution. The molded article after immersed in the plating solution will have formed thereon a plating layer 5, only in the area where the laser light has been irradiated.

The method of this invention can form the plating layer (circuit pattern) having a pitch of 1 mm or finer, which is even 150 μm or finer (the lower limit is 30 μm or above, although not specifically limited). For the purpose of suppressing the thus formed plating layer from being corroded or degraded, the electroless plating may further be followed by protection with nickel or gold. Alternatively for the same purpose, electroless plating may be followed by electroplating, to thereby form a necessary thickness of film within a short time.

The method for manufacturing the plated molded article is suitably used as a method for manufacturing a mobile electronic equipment component having an antenna, the method containing the aforementioned method for manufacturing the plated molded article.

The molded article obtained from the thermoplastic resin composition of this invention is typically applicable to various purposes including electronic components (in particular, mobile electronic equipment component) such as connector, switch, relay and conductive circuit. The molded article obtained from the thermoplastic resin composition of this invention is also suitably applicable to sensor component.

In addition, descriptions in JP-A-2011-219620, JP-A-2011-195820, JP-A-2011-178873, JP-A-2011-168705 and JP-A-2011-148267 may be referred to, without departing from the spirit of this invention.

EXAMPLES

This invention will further be detailed referring to Examples. All materials, amounts of consumption, ratios, process details and procedures described in Examples below may suitably be modified, without departing from the spirit of this invention. Hence, the scope of this invention is by no means limited to specific Examples below.

<(A) Thermoplastic Resin>

PAPXD10: Obtained by the method described below.

Into a reactor with an inner volume of 50 liter equipped with a stirrer, a partial condenser, a cooler, a thermometer, a dropping device, a nitrogen gas feeding tube, and a strand die, placed were 8950 g (44.25 mol) of sebacic acid (product name "sebacic acid TA", from Itoh Oil Chemicals Co., Ltd.), 12.54 g (0.074 mol) of calcium hypophosphite, and 6.45 g (0.079 mol) of sodium acetate, all being precisely weighed.

Inside of the reactor was fully purged with nitrogen gas, pressurized with nitrogen gas to 0.4 MPa, and the content kept under stirring was heated from 20° C. to 190° C., to thereby uniformly melt sebacic acid over 55 minutes. Next, 5960 g (43.76 mol) of paraxylylenediamine (from Mitsubishi Gas Chemical Company Inc.) was added dropwise over 110 minutes, to the content kept under stirring, during which the inner temperature of the reactor continuously elevated up to 293° C. During the dropwise addition, the pressure was controlled to 0.42 MPa, and produced water was eliminated through the partial condenser and the cooler out of the system. Temperature of the partial condenser was controlled within the range from 145 to 147° C. Upon completion of dropwise addition of paraxylylenediamine, the polycondensation reaction was allowed to proceed for 20 minutes while keeping the inner pressure of reactor at 0.42 MPa, during which the inner temperature of reactor was elevated up to 296° C. The inner pressure of reactor was then dropped over 30 minutes from 0.42 MPa down to 0.12 MPa, during which the inner temperature was elevated up to 298° C. The pressure was then dropped down to 0.08 MPa at a rate of 0.002 MPa/min over 20 minutes, so as to control the content of fraction with a molecular weight of 1,000 or smaller. The temperature inside the reactor, at the end of pressure drop, was found to be 301° C. The system was then pressurized with nitrogen gas, conditioned at an inner temperature of reactor of 301° C. and at a resin temperature of 301° C., the polymer was taken out through the strand die into the form of strands, cooled in cooling water at 20° C., and then pelletized to obtain approximately 13 kg of polyamide resin. Cooling time in the cooling water was preset to 5 seconds, and drawing speed of strands was preset to 100 m/min. The polyamide resin will be referred to as "PAPXD10" hereinafter.

PAMP6: Obtained according to the synthetic method below.

Into a reactor equipped with a stirrer, a partial condenser, a total condenser, a thermometer, a dropping funnel, a nitrogen gas feeding tube, and a strand die, placed were 7220 g (49.4 mol) of adipic acid (from Rhodia Inc.) and 11.66 g of sodium acetate/sodium hypophosphite monohydrate (molar ratio=1/1.5). The inside of the reactor was thoroughly purged with nitrogen gas, and heated under a small flow rate of nitrogen gas while agitating the system up to 170° C. for melting. To the melt content kept under stirring in the reactor, added dropwise was 6647 g of mixed xylylendiamine having a molar ratio of metaxylylenediamine and paraxylylenediamine of 70/30 (metaxylylenediamine=34.16 mol, paraxylylenediamine=14.64 mol, from Mitsubishi Gas Chemical Company, Inc.), and the inner temperature was continuously elevated over 2.5 hours up to 260° C., while eliminating water released from condensation out of the system. After completion of the dropwise addition, the inner temperature was elevated, upon arrival at 270° C. the inside of the reactor was evacuated, the inner temperature was further elevated up to 280° C. at which the melt polycondensation reaction was allowed to proceed for 20 minutes. The system was then pressurized with nitrogen gas, the obtained polymer was taken out through the strand die, and then pelletized, to thereby obtain a polyamide resin. The product will be referred to as "PAMP6" hereinafter.

PA66: Amilan CM3001, from Toray Industries, Inc.

S-3000FN: polycarbonate resin, from Mitsubishi Engineering-Plastics Corporation

AT-08: ABS resin (acrylonitrile-butadiene-styrene copolymer resin, from Nippon A&L Inc.

GG500D: PET resin (polyethylene terephthalate resin), from Mitsubishi Chemical Corporation 5007-C: polybutylene terephthalate resin (water absorption=0.09% by mass), Novaduran (registered trademark, product name) 5007, from Mitsubishi Engineering-Plastics Corporation, intrinsic viscosity=0.70 dL/g, terminal carboxy group content=15 eq/ton 5605N: 10 mol % isophthalic acid copolymerized polybutylene terephthalate resin (water absorption=0.11% by mass), Novaduran (registered trademark, product name) 5605, from Mitsubishi Engineering-Plastics Corporation, intrinsic viscosity=0.84 dL/g, terminal carboxy group content=15 eq/ton 1010X1: polyamide 6 resin (water absorption=1.6% by mass), UBE Nylon 1010X1 (product name), from Ube Industries, Ltd., relative viscosity=2.2 ml/g <(B) LDS Additive>

CP-5C: antimony-doped tin oxide, from Keeling & Walker, Ltd. 23K: aluminum-doped zinc oxide, from Hakusui Tech Co., Ltd., resistivity (product standard value)=100 to 500 Ω·cm Black 1G: copper chromium oxide ($CuCr_2O_4$), from Shepherd Color <(C) Inorganic Reinforcing Fiber>

T-756H: glass fiber, E-glass, chopped strand, from Nippon Electric Glass Co., Ltd., number average fiber diameter=10 μm, cut length=3 mm T-187: glass fiber, E-glass, chopped strand, from Nippon Electric Glass Co., Ltd., number average fiber diameter=13 μm, cut length=3 mm T-127: glass fiber, ECS03T-127 (product name), from Nippon Electric Glass Co., Ltd., number average fiber diameter=13.5 μm, chopped strand, cut length=3 mm, surface treated with novolac epoxy resin <(D) Graphite>

CP: flaky graphite, number average particle diameter=10 μm, from Nippon Graphite Fiber Corporation PC-30: flaky graphite, number average particle diameter=30 μm, from Ito Graphite Co., Ltd.

Gimprovia Gi-PW-F031: graphene, from Taiwan Graphene Co. Ltd., number average particle diameter=10 μm <Carbon Filler Other than Graphite>

Carbon black: #45, from Mitsubishi Chemical Corporation, number average particle diameter=45 nm Carbon fiber: Pyrofil TRO6NL, from Mitsubishi Chemical Corporation CNT: multilayered carbon nanotube, average fiber diameter=15 nm, aspect ratio=100 to 1000

<Mold Releasing Agent>

CS-8CP: calcium montanate, from Nitto Kasei Co., Ltd.

VPG861: pentaerythritol tetrastearate, from Cognis Japan Co., Ltd.,

PED522: polyethylene oxide wax, LICOWAX PED 522 (product name), from Clariant AG <Nucleating Agent>

MW5000S: talc, Micron White 5000S (number average particle diameter=5 μm), from Hayashi Kasei Co., Ltd., <Stabilizer>

AO-60: phenol-based stabilizer, pentaerythritol tetrakis[3-(3,5-di-tert-butyl-4-hydroxyphenyl) propionate], from ADEKA Corporation, ADEKASTAB AO-60

<Epoxy Compound>

JER1003: product name: Epikote 1003, from Mitsubishi Chemical Corporation, bisphenol A-diglycidyl ether-type epoxy compound, epoxy equivalent≈670 to 770 g/eq, mass average molecular weight=1300

EP-17: bisphenol A-type epoxy compound, from ADEKA Corporation, epoxy equivalent=185 g/eq, molecular weight=370

Example 1

<Compound>

Graphite, or a carbon filler other than graphite, was preliminarily fed into an extruder together with a part of the (A) thermoplastic resin listed in Table 1, and melt-kneaded to obtain a masterbatch. Graphite content in the masterbatch was found to be 40% by mass.

Next, the ingredients other than inorganic reinforcing fiber and graphite were individually weighed according to the chemical composition listed in Table described later, blended with the masterbatch in a tumbler, and after 20 minute mixing in the tumbler, the content was fed into a twin screw extruder (TEX30α, from the Japan Steel Works, Ltd.) from the base thereof and melted, to which inorganic reinforcing fiber, whose amount given in Table below, was side-fed, kneaded at a screw rotation speed of 200 rpm, a discharge rate of 40 kg/hr, and a barrel temperature of 300° C., the molten resin extruded in the form of strands was cooled in a water tank, pelletized using a pelletizer, to obtain pellets.

Note that the individual ingredients listed in Table 1 are given in % by mass (the same will apply Table 2 and following Tables).

<Platability>

The pellets obtained by the aforementioned method of manufacturing were dried at 120° C. for 4 hours. Molding was then carried out using an injection molding machine (NEX140 III) from Nissei Plastic Industrial Co., Ltd., by injecting the resin through a 60×60 mm fan gate with a thickness of 1.5 mm, into a 60×60 mm cavity with a thickness of 2 mm as a die, at a cylinder temperature of 300° C. and a die temperature of 130° C. The part corresponding to the gate was cut off to obtain a plate specimen. On a 10×10 mm area of the obtained plate specimen, laser light was irradiated using a laser irradiation apparatus VMc1 from Trumpf (YAG laser of 1064 nm, maximum laser output=15 W), at an output power of 6 W or 8 W, a frequency of 60 kHz or 80 kHz, and a scanning speed of 4 m/s. The subsequent plating was carried out in an electroless plating bath ENPLATE LDS CU400PC from Enthone, at 48° C. The platability was determined by visually observing the thickness of plated copper grown over 20 minutes. The platability, in terms of laser conditional range and appearance of plating, was evaluated as follows. Results are summarized in Table 1 below.

«Laser Conditional Range»

A: well plated under any conditions;
B: thinly plated (but practical) under some conditions; and
C: not plated under half or more conditions.

«Appearance of Plating»

A plating layer with the best appearance, among from plating layers obtained under four types of conditions (combination of output and frequency of laser irradiation conditions, including 6 W output/60 kHz frequency, 6 W output/80 kHz frequency, 8 W output/60 kHz frequency, and output 8 W/80 kHz frequency), was evaluated as follows:

A: good appearance (plating layer found to be thick, with deep copper color);
B: plated, but somewhat thin (practical level); and
C: not plated at all.

<Dielectric Properties (Dk and Df)>

The pellets obtained in the method of manufacturing were dried at 120° C. for 4 hours. Molding was then carried out using an injection molding machine (NEX140 III) from Nissei Plastic Industrial Co., Ltd., by injecting the resin through a 100×100 mm fan gate with a thickness of 1.5 mm, into a 100×100 mm cavity with a thickness of 2 mm as a die, at a cylinder temperature of 300° C. and a die temperature of 130° C. The part corresponding to the gate was cut off to obtain a plate specimen.

The thus obtained plate specimen was subjected to measurement of dielectric constant (Dk) and dielectric loss tangent (Df) at 2.45 GHz, using a perturbed cavity resonator.

The perturbed cavity resonator employed here was CP-481 from KANTO Electronic Application and Development Inc.

Examples 2 to 11, Comparative Examples 1 to 9

Pellets were manufactured in the same as in Example 1, except that the ingredients to be blended were changed as summarized in Tables 1 and 2 below, from those of Example 1. The thus obtained pellets were checked to determine platability (laser conditional range), platability (good appearance of plating) and dielectric properties, in the same way as in Example 1. Results are summarized in Tables 1 and 2.

TABLE 1

|  |  | Example 1 | Comparative Example 1 | Example 2 | Comparative Example 2 | Example 3 | Example 4 |
|---|---|---|---|---|---|---|---|
| (A) Thermoplastic resin | PAPXD10 | 62.9 | 63.7 | 57.9 | 58.7 | 61.7 | 59.7 |
| (B) LDS additive | CP-5C | 5.0 | 5.0 | 10.0 | 10.0 | 5.0 | 5.0 |
| (C) Inorganic reinforcing fiber | T-756H | 30.0 | 30.0 | 30.0 | 30.0 | 30.0 | 30.0 |
| (D) Graphite | CP | 0.8 |  | 0.8 |  | 2.0 | 4.0 |
| Mold releasing agent | CS-8CP | 0.3 | 0.3 | 0.3 | 0.3 | 0.3 | 0.3 |
| Nucleating agent | MW5000S | 1.0 | 1.0 | 1.0 | 1.0 | 1.0 | 1.0 |
| Total |  | 100.0 | 100.0 | 100.0 | 100.0 | 100.0 | 100.0 |
| (B)/(D) mass ratio |  | 6.3 | — | 12.5 | — | 2.5 | 1.3 |
| Result of evaluation | Platability (range of laser condition) | A | C | A | C | A | B |
|  | Platability (Appearance of plating) | A | A | A | A | A | B |
| Dielectric property @2.45 GHz | Dielectric constant | 4.5 | 3.6 | 4.7 | 3.9 | 5.8 | 8.7 |
|  | Dielectric loss tangent | 0.013 | 0.011 | 0.014 | 0.012 | 0.019 | 0.036 |

TABLE 2

|  |  | Comparative Example 3 | Comparative Example 4 | Comparative Example 5 | Comparative Example 6 | Comparative Example 7 | Example 5 | Example 6 |
|---|---|---|---|---|---|---|---|---|
| (A) Thermoplastic resin | PAPXD10 | 55.7 | 63.5 | 61.7 | 61.7 | 61.7 |  | 61.7 |
|  | PAMP6 |  |  |  |  |  | 61.7 |  |
|  | PA66 |  |  |  |  |  |  |  |
| (B) LDS additive | CP-5C | 5.0 | 5.0 | 5.0 | 5.0 | 5.0 | 5.0 |  |
|  | 23K |  |  |  |  |  |  |  |
|  | Black1G |  |  |  |  |  |  | 5.0 |
| (C) Inorganic reinforcing fiber | T-756H | 30.0 | 30.0 | 30.0 | 30.0 | 30.0 | 30.0 | 30.0 |
| (D) Graphite | CP | 8.0 | 0.2 |  |  |  | 2.0 | 2.0 |
| (D) Graphene | Gimprovia Gi-PW-F031 |  |  |  |  |  |  |  |
| Carbon filler other than graphite | Carbon black |  |  | 2.0 |  |  |  |  |
|  | Carbon fiber |  |  |  | 2.0 |  |  |  |
|  | CNT |  |  |  |  | 2.0 |  |  |
| Mold releasing agent | CS-8CP | 0.3 | 0.3 | 0.3 | 0.3 | 0.3 | 0.3 | 0.3 |
| Nucleating agent | MW5000S | 1.0 | 1.0 | 1.0 | 1.0 | 1.0 | 1.0 | 1.0 |
| Total |  | 100.0 | 100.0 | 100.0 | 100.0 | 100.0 | 100.0 | 100.0 |
| Mass ratio (B)/(D) |  | 0.6 | 25.0 | 2.5 | 2.5 | 2.5 | 2.5 | 2.5 |
| Results of evaluation | Platability (laser conditional range) | C | C | C | C | C | A | A |
|  | Platability (appearance of plating) | C | A | C | A | A | A | A |
| Dielectric property @2.45 GHz | Dielectric constant | 13.9 | 3.9 | 3.8 | 18.5 | 13.5 | 6.2 | 5.7 |
|  | Dielectric loss tangent | 0.071 | 0.012 | 0.013 | 0.041 | 0.033 | 0.016 | 0.018 |

|  |  | Example 7 | Example 8 | Example 9 | Example 10 | Comparative Example 8 | Example 11 | Comparative Example 9 |
|---|---|---|---|---|---|---|---|---|
| (A) Thermoplastic resin | PAPXD10 | 61.7 |  |  |  |  |  |  |
|  | PAMP6 |  | 62.9 | 61.7 | 62.9 | 63.7 |  |  |
|  | PA66 |  |  |  |  |  | 61.7 | 63.7 |
| (B) LDS additive | CP-5C |  |  |  |  |  |  |  |
|  | 23K |  |  |  |  |  |  |  |
|  | Black1G | 5.0 | 5.0 | 5.0 | 5.0 | 5.0 | 5.0 | 5.0 |
| (C) Inorganic reinforcing fiber | T-756H | 30.0 | 30.0 | 30.0 | 30.0 | 30.0 | 30.0 | 30.0 |
| (D) Graphite | CP | 2.0 | 0.8 | 2.0 |  |  | 2.0 |  |
| (D) Graphene | Gimprovia G1-PW-F031 |  |  |  | 0.8 |  |  |  |
| Carbon filler other than graphite | Carbon black |  |  |  |  |  |  |  |
|  | Carbon fiber |  |  |  |  |  |  |  |
|  | CNT |  |  |  |  |  |  |  |
| Mold releasing agent | CS-8CP | 0.3 | 0.3 | 0.3 | 0.3 | 0.3 | 0.3 | 0.3 |
| Nucleating agent | MW5000S | 1.0 | 1.0 | 1.0 | 1.0 | 1.0 | 1.0 | 1.0 |
| Total |  | 100.0 | 100.0 | 100.0 | 100.0 | 100.0 | 100.0 | 100.0 |
| Mass ratio (B)/(D) |  | 2.5 | 6.3 | 2.5 | 6.3 | — | 2.5 | — |
| Results of evaluation | Platability (laser conditional range) | A | A | A | A | A | A | A |
|  | Platability (appearance of plating) | A | A | A | A | A | A | A |
| Dielectric property @2.45 GHz | Dielectric constant | 5.6 | 4.8 | 6.1 | 4.9 | 3.9 | 5.8 | 3.5 |
|  | Dielectric loss tangent | 0.018 | 0.012 | 0.015 | 0.013 | 0.011 | 0.016 | 0.011 |

Note:
All amounts of blending given in parts by mass.

Example 12

<Compound>

Graphite, or a carbon filler other than graphite, was preliminarily fed into an extruder together with a part of the (A) thermoplastic resin listed in Table 1, and melt-kneaded to obtain a masterbatch. Graphite content in the masterbatch was found to be 40% by mass.

Next, the ingredients other than graphite were individually weighed according to the chemical composition listed in Table 1 described later, blended with the masterbatch in a tumbler, and after 20 minute mixing in the tumbler, the content was fed into a twin screw extruder (TEX30α, from the Japan Steel Works, Ltd.) from the base thereof and melted, to which inorganic reinforcing fiber whose amount given in Table below was side-fed, kneaded at a screw rotation speed of 200 rpm, a discharge rate of 40 kg/hr, and a barrel temperature of 280° C., the molten resin extruded in the form of strands was cooled in a water tank, pelletized using a pelletizer, to obtain pellets.

Example 13 to 18, Comparative Example 10 to 12

Pellets of the individual resin compositions were manufactured in Examples 13 to 18 and in Comparative Examples 10 to 12, in the same way as in Example 12, except that the chemical compositions were changed as summarized in Table 3. Note that, only in Example 14, the inorganic reinforcing fiber was fed at the same time the ingredients other than the graphite were fed.

<Platability and Dielectric Properties of Plated Molded Article>

Platability (laser conditional range, appearance of plating) was tested in the same way as in Example 1, except that the cylinder temperature was set to 280° C., and the die temperature was set to 80° C. Again in the same way as in Example 1, dielectric properties (dielectric constant, dielectric loss tangent) were measured. Results are summarized in Table 3.

below. The thus obtained pellets were subjected to measurements of platability (laser conditional range), platability (good appearance of plating) and dielectric properties. Results are summarized again in Table 4.

TABLE 3

|  |  | Example 12 | Example 13 | Example 14 | Example 15 | Example 16 |
|---|---|---|---|---|---|---|
| (A) Thermoplastic resin | S-3000FN | 84.7 | 84.7 | 54.7 | 64.7 | 64.7 |
|  | AT-08 |  |  |  | 20.0 |  |
|  | GG500D |  |  |  |  | 20.0 |
| (B) LDS additive | CP-5C | 10.0 |  | 10.0 | 10.0 | 10.0 |
|  | Black1G |  | 10.0 |  |  |  |
| (C) Inorganic reinforcing fiber | T-187 |  |  | 30.0 |  |  |
| (D) Graphite | PC-30 | 5.0 | 5.0 | 5.0 | 5.0 | 5.0 |
| (D) Graphene | Gimprovia Gi-PW-F031 |  |  |  |  |  |
| Carbon filler other than graphite | Carbon black |  |  |  |  |  |
|  | CNT |  |  |  |  |  |
| Mold releasing agent | VPG861 | 0.3 | 0.3 | 0.3 | 0.3 | 0.3 |
| Total |  | 100.0 | 100.0 | 100.0 | 100.0 | 100.0 |
| (B)/(D) |  | 2.0 | 2.0 | 2.0 | 2.0 | 2.0 |
| Results of evaluation | Platability (laser conditional range) | A | A | A | A | A |
|  | Platability (appearance of plating) | A | A | A | A | A |
| Dielectrid property @2.45 GHz | Dielectric constant | 6.8 | 6.7 | 7.8 | 6.4 | 6.9 |
|  | Dielectric loss tangent | 0.018 | 0.016 | 0.024 | 0.015 | 0.020 |

|  |  | Example 17 | Example 18 | Comparative Example 10 | Comparative Example 11 | Comparative Example 12 |
|---|---|---|---|---|---|---|
| (A) Thermoplastic resin | S-3000FN | 88.7 | 87.7 | 89.7 | 92.7 | 88.7 |
|  | AT-08 |  |  |  |  |  |
|  | GG500D |  |  |  |  |  |
| (B) LDS additive | CP-5C |  |  |  |  |  |
|  | Black1G | 10.0 | 10.0 | 10.0 | 5.0 | 10.0 |
| (C) Inorganic reinforcing fiber | T-187 |  |  |  |  |  |
| (D) Graphite | PC-30 |  |  |  |  |  |
| (D) Graphene | Gimprovia G1-PW-F031 | 1.0 | 2.0 |  |  |  |
| Carbon filler other than graphite | Carbon black |  |  |  | 2.0 |  |
|  | CNT |  |  |  |  | 1.0 |
| Mold releasing agent | VPG861 | 0.3 | 0.3 | 0.3 | 0.3 | 0.3 |
| Total |  | 100.0 | 100.0 | 100.0 | 100.0 | 100.0 |
| (B)/(D) |  | 10.0 | 5.0 | — | 2.5 | 10.0 |
| Results of evaluation | Platability (laser conditional range) | A | A | B | C | A |
|  | Platability (appearance of plating) | A | A | B | C | A |
| Dielectrid property @2.45 GHz | Dielectric constant | 3.6 | 4.5 | 2.8 | 2.7 | 7.2 |
|  | Dielectric loss tangent | 0.006 | 0.007 | 0.006 | 0.006 | 0.026 |

Note:
All amounts of blending given in parts by mass.

Examples 19 to 22, Comparative Examples 13, 14

Resin pellets were manufactured in the same way as in Example 1, except that the ingredients of the thermoplastic resin compositions were changed as summarized in Table 4

Note that, the barrel temperature during the compounding was set to 270° C.; and the cylinder temperature and the die temperature during the platability test were set to 260° C. and 120° C., respectively.

TABLE 4

|  |  | Comparative Example 13 | Example 19 | Comparative Example 14 | Example 20 | Example 21 | Example 22 |
|---|---|---|---|---|---|---|---|
| (A) Thermoplastic resin | 5007-C | 64.2 | 62.2 | 18.7 | 18.4 | 18.1 | 17.5 |
|  | 5605N |  |  | 18.7 | 18.4 | 18.1 | 17.5 |
|  | 1010X1 |  |  | 24.8 | 24.6 | 24.0 | 23.2 |
| (B) LDS additive | Black 1G | 5.0 | 5.0 | 5.0 | 5.0 | 5.0 | 5.0 |
| (C) Inorganic reinforcing fiber | T-127 | 30.0 | 30.0 | 30.0 | 30.0 | 30.0 | 30.0 |
| (D) Graphite | CP |  | 2.0 |  | 0.8 | 2.0 | 4.0 |
| Stabilizer | AO-60 | 0.2 | 0.2 | 0.2 | 0.2 | 0.2 | 0.2 |

TABLE 4-continued

|  |  | Comparative Example 13 | Example 19 | Comparative Example 14 | Example 20 | Example 21 | Example 22 |
|---|---|---|---|---|---|---|---|
| Mold releasing agent | PED522 | 0.2 | 0.2 | 0.2 | 0.2 | 0.2 | 0.2 |
| Epoxy compound | JER1003 |  |  | 2.0 | 2.0 | 2.0 | 2.0 |
|  | EP-17 | 0.4 | 0.4 | 0.4 | 0.4 | 0.4 | 0.4 |
| Total |  | 100.0 | 100.0 | 100.0 | 100.0 | 100.0 | 100.0 |
| Mass ratio (B)/(D) |  | — | 2.5 | — | 6.3 | 2.5 | 1.3 |
| Results of evaluation | Platability (laser conditional range) | A | A | A | A | A | A |
|  | Platability (appearance of plating) | A | A | A | A | A | A |
| Dielectric Property @2.45 GHz | Dielectric constant | 3.4 | 6.8 | 3.5 | 4.4 | 6.2 | 10.2 |
|  | Dielectric loss tangent | 0.010 | 0.018 | 0.011 | 0.012 | 0.015 | 0.021 |

As clearly taught by the results above, the thermoplastic resin compositions of this invention were found to be adaptable to wide range of laser conditions for forming thereon the plating layer, while retaining high platability (good appearance of plating) (Examples 1 to 18). Also sufficiently large dielectric constant and sufficiently low dielectric loss tangent in a high frequency band (2.45 GHz) were found to be achieved.

In contrast, the cases where the carbon filler including graphite was not blended (Comparative Examples 1, 2 and 10), and the cases where the other carbon filler was blended in place of graphite (Comparative Examples 5 to 7, and 11) failed to adapt themselves to wide range of laser conditions.

Comparative Examples 8, 9, 13 and 14, which are free of graphite, were found to have lower dielectric constant, and Comparative Example 12 was found to have higher dielectric loss tangent.

Meanwhile, the cases containing graphite, but too much or too less (Comparative Examples 3 and 4), failed to adopt themselves to wide range of laser conditions. Also the case with too much graphite (Comparative Example 3) was found to have poor platability (appearance of plating).

In conclusion, with the amount of blending of graphite controlled within a predetermined range, and with the graphite content suitably balanced with the LDS content, this invention was found to enable formation of a plating layer under wide range of laser conditions, while retaining high platability (good appearance of plating), and to achieve excellent dielectric properties in higher frequency bands.

REFERENCE SIGNS LIST 1 molded article
2 laser
3 laser-irradiated area
4 plating solution
5 plating layer

The invention claimed is:

1. A thermoplastic resin composition comprising:
10 to 90% by mass of (A) thermoplastic resin;
1 to 20% by mass of (B) laser direct structuring additive; and
0.3 to 7,0% by mass of (D) graphite, wherein the (D) graphite is flaky,
a total of the ingredient (A), the ingredient (B) and the ingredient (D) being always kept at 100% by mass or below, and
a ratio by mass given by ingredient (B)/ingredient (D) being 1.0 to 20.

2. The thermoplastic resin composition of claim 1, further comprising 60% by mass or less of (C) inorganic reinforcing fiber, wherein the (C) inorganic reinforcing fiber is a glass fiber.

3. The thermoplastic resin composition of claim 1, further comprising 10% by mass or more and 60% by mass or less of (C) inorganic reinforcing fiber.

4. The thermoplastic resin composition of claim 2, wherein a total of the ingredient (A), the ingredient (B), the ingredient (C) and the ingredient (D) accounts for 95% by mass or more of the thermoplastic resin composition.

5. The thermoplastic resin composition of claim 1, wherein the thermoplastic resin is selected from polyamides resin, polycarbonate resin, polyester resin, polyolefin resin, polypropylene resin, styrene-based resin, polyethylene resin and acrylic resin.

6. The thermoplastic resin composition of claim 1, wherein the (A) thermoplastic resin contains a xylylenediamine-based polyamide resin that is composed of a diamine-derived structural unit and a dicarboxylic acid-derived structural unit, 50 mol % or more of the diamine-derived structural unit being derived from xylylenediamine.

7. The thermoplastic resin composition of claim 1, wherein the (A) thermoplastic resin contains a polycarbonate resin.

8. The thermoplastic resin composition of claim 1, wherein polybutylene terephthalate accounts for 15 to 45% by mass, isophthalate-modified polybutylene terephthalate accounts for 15 to 45% by mass, and polyamide resin accounts for 70 to 10% by mass, of the (A) thermoplastic resin.

9. The thermoplastic resin composition of claim 1, wherein the (B) laser direct structuring additive contains a metal oxide that contains antimony and tin.

10. The thermoplastic resin composition of claim 1, wherein the (B) laser direct structuring additive contains copper chromium oxide.

11. The thermoplastic resin composition of claim 1, wherein the (B) laser direct structuring additive contains a conductive oxide that contains aluminum and zinc and has a resistivity of $10^3$ Ω·cm or smaller.

12. The thermoplastic resin composition of claim 1, wherein a content of a carbon filler other than the graphite is less than 10% by mass of the graphite content.

13. A molded article formed of the thermoplastic resin composition described in claim 1.

14. The molded article of claim 12, having on a surface thereof a plating layer.

15. The molded article of claim 14, wherein the plating has an antenna performance.

16. The molded article of claim 13, being a mobile electronic equipment component.

17. The molded article of claim 13, being a sensor component.

18. A method for manufacturing the thermoplastic resin composition described in claim 1, the method comprising preparing a masterbatch of the (D) graphite using a thermoplastic resin, and then kneading the masterbatch with other ingredients.

19. A method for manufacturing a plated molded article, the method comprising irradiating laser light on a molded article formed of the thermoplastic resin composition described in claim 1, and then applying a metal to form a plating layer.

* * * * *